(12) United States Patent
Hunter

(10) Patent No.: US 7,648,542 B1
(45) Date of Patent: Jan. 19, 2010

(54) STATIC DISSIPATIVE GLASS FILTRATION FABRIC

(75) Inventor: Scott A. Hunter, Kernersville, NC (US)

(73) Assignee: BGF Industries, Inc., Greensboro, NC (US)

( * ) Notice: Subject to any disclaimer, the term of this patent is extended or adjusted under 35 U.S.C. 154(b) by 0 days.

(21) Appl. No.: 12/250,014

(22) Filed: Oct. 13, 2008

(51) Int. Cl.
*B01D 46/00* (2006.01)

(52) U.S. Cl. ............................. 55/382; 55/486; 55/524; 55/527; 55/528

(58) Field of Classification Search ................... 55/486, 55/497, 500, 502, 522, 498, 524, 528, 382, 55/DIG. 39, 381, 361, 527; 96/66; 95/273, 95/285; 210/500.21, 506

See application file for complete search history.

(56) References Cited

U.S. PATENT DOCUMENTS

| | | | |
|---|---|---|---|
| 3,933,643 A | 1/1976 | Colvin | |
| 4,239,794 A | 12/1980 | Allard | |
| 4,347,278 A | 8/1982 | Flautt | |
| 4,531,957 A | 7/1985 | Malik | |
| 5,635,252 A | 6/1997 | Fraser | |
| 5,814,405 A | 9/1998 | Branca | |
| 6,036,735 A | 3/2000 | Carter | |
| 6,168,835 B1 | 1/2001 | Carter | |
| 7,501,003 B2 * | 3/2009 | Muller et al. | 55/486 |
| 2003/0110745 A1 * | 6/2003 | Smithies | 55/524 |
| 2004/0074391 A1 * | 4/2004 | Durante et al. | 95/285 |
| 2004/0168419 A1 * | 9/2004 | Smithies | 55/521 |
| 2004/0194624 A1 * | 10/2004 | Ohya et al. | 95/273 |
| 2005/0086916 A1 * | 4/2005 | Caron | 55/382 |
| 2006/0230731 A1 * | 10/2006 | Kalayci et al. | 55/486 |
| 2006/0231487 A1 * | 10/2006 | Bartley et al. | 210/506 |
| 2007/0028767 A1 | 2/2007 | Choi et al. | |
| 2008/0302074 A1 * | 12/2008 | Gebert et al. | 55/521 |
| 2009/0120048 A1 * | 5/2009 | Wertz et al. | 55/521 |

FOREIGN PATENT DOCUMENTS

| | | |
|---|---|---|
| CA | 2202657 C | 1/2001 |
| WO | 02/074416 A1 | 9/2002 |
| WO | 03/047719 A1 | 6/2003 |

* cited by examiner

*Primary Examiner*—Duane Smith
*Assistant Examiner*—Minh-Chau T Pham
(74) *Attorney, Agent, or Firm*—Womble Carlyle Sandridge & Rice, PLLC

(57) ABSTRACT

A bag house filtration system in which the filter media includes a woven textile formed from glass yarns other high temperature resistant yarns. A first bath is applied to the textile which contains a conductive component, a first fluoropolymer and a lubricant (in some cases where the yarns are glass). A second bath containing primarily a second fluoropolymer is then applied to the textile and the first composition to seal the first composition on the textile. The textile, so treated dissipates the static electricity normally generated in the filter media thus reducing excessive buildup of contaminating particles and enhancing cleaning of the bag during use.

36 Claims, 4 Drawing Sheets

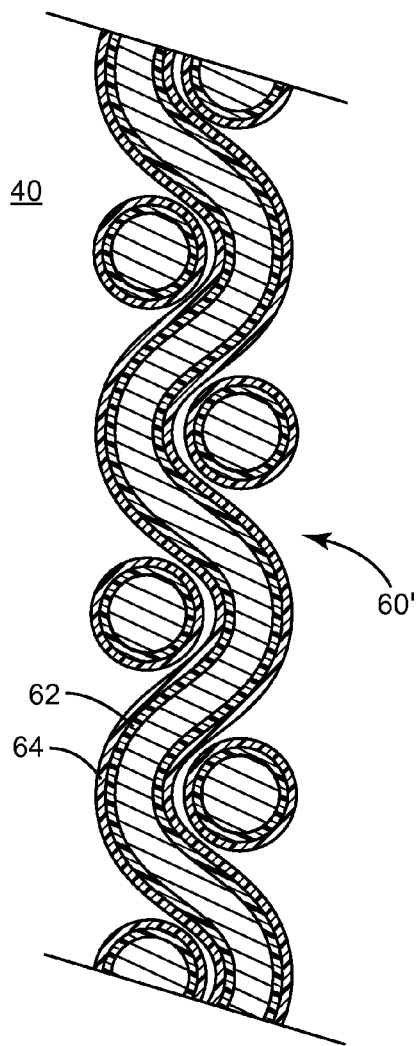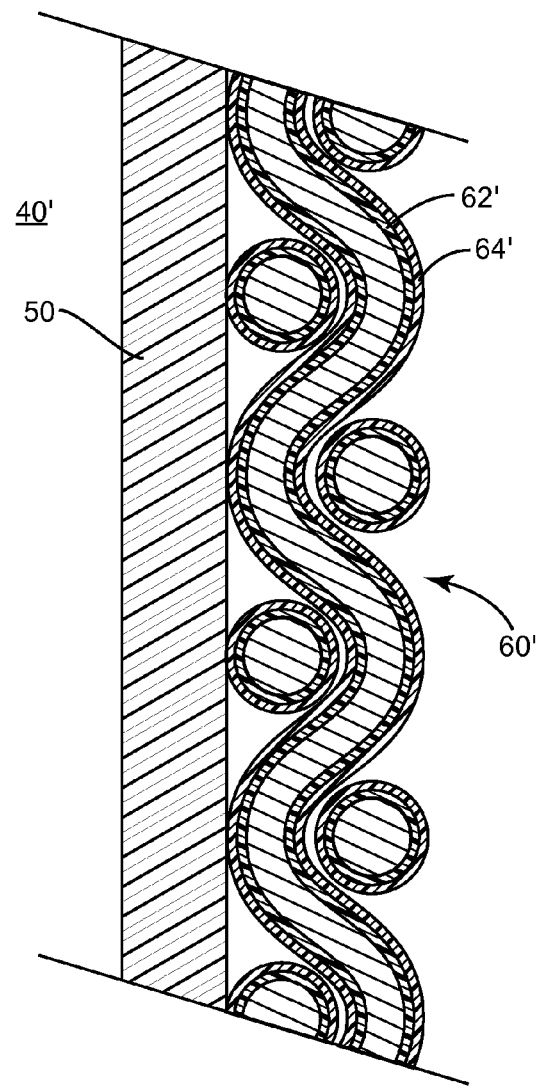
FIGURE 4A                    FIGURE 4B

STATIC DISSIPATIVE GLASS FILTRATION FABRIC

FIELD OF THE INVENTION

The invention is directed to a bag house filtration system and the textile fabric used as a filter or filter substrate in the bags.

BACKGROUND

Bag house filtration systems are primarily used in industrial environments to remove dust, and contaminants and other particles from an air stream. The purpose of bag house filtration systems can be pollution control to improve the air quality in a confined environment, or it can be to reclaim particles found in air that can be reused in a manufacturing process e.g. cement factories, textile mills, carbon black production, furniture and woodworking plants or both. Bag house filtration systems circulate air through the wall(s) of a bag which collects or reclaims the particles. The bag, typically formed from a textile fabric or media, performs as both a barrier to the particles and a conduit for air to pass through. The dual functionality required for modern filter media have focused on three objectives: effectively remove particles from the air, reduce the energy required to circulate air, and to enhance the cleaning of the bags as needed.

The ability to clean the air stream circulated through the bag house systems has been referred to in the art as filtration efficiency. A measure of filtration efficiency is the ratio of downstream (output) particle concentration compared to the upstream (input) particle concentration that has passed through the bag or filter media. Particle size and air flow rates impact filtration efficiency, however, in general the higher the aforesaid ratio the more efficient the bag filter media. As more particulate is collected on the surface of the filter media the energy required to transport air through the bag (or any filter media) also increases, thus the balance between effective air cleaning and energy usage is delicate.

Energy usage in a bag house system is related to the pressure drop through the bags or filter media. Pressure drop, as used herein, refers to the difference in the rate of air flow between each side of a filter media. A low pressure drop media requires less energy to push air through the bag lessening the overall energy consumption of the system. Over time a phenomena referred to as filter cake formation occurs where the bag collects particles on its surface. As the filter cake increases the pressure drop of the filtration system increases the energy requirements of the bag house filtration system. Thus, the bag surfaces should be kept relatively clean in order that the filter operation can continue without interruption and with a minimum of energy usage.

Various approaches are used to control filter cake formation and remove the filter cake once formed. A method typically used in reclamation type bag house systems includes mechanically shaking the bag so that the filter cake will flake off. Another approach utilizes a pulse of air abruptly flexing the filter media. The latter method is used most in pollution control or abatement systems. Both methods are very dynamic applications resulting in wear of the bag. Thus, the less often the cleaning process occurs and the easier the particles are to remove, the better the bag life.

In addition, due to the desire for increased filtration efficiency (trapping of more particles and smaller particles), advances have been made in which porous substrates have been used as supporting materials for a porous polymeric film or membrane which actually forms the filtration media. In such bag house filtration systems the substrate is generally formed from a woven textile material, which will have laminated thereto a polymeric film as discussed above.

In some cases for bag house usage, there have been developed filter media having conductive features and capable of generating an electric charge. However, the conductivity and electric charge of such filter media is for the purpose of attracting and fixing particles on the surfaces filter media. This will enhance filtration efficiency. Such materials have been used in cartridge and precipitator type filtration systems. Thus, these systems serve to improve the particle attraction and fixation onto the surface of a given filter media by charging the conductive particles so that the particles to be collected are attracted to the filtration media itself.

SUMMARY OF INVENTION

In certain types of bag house filtration systems, particularly those which operate at high temperatures (as used herein "high temperatures" means 300° F. and above, usually 300° F.-500° F. and sometimes up to 700° F. for short surges), a woven filamentary glass filter material or substrate is used. In addition to the isolative character of some dusts, the air moving by the glass yarns in such systems generates a static charge which causes the collected particles to cling to the bag surface, rather than dropping off. This causes increased energy usage because of the buildup of particulate and makes cleaning of the bag more difficult. Dissipating the static charge on the glass filter or substrate would lessen the likelihood that particles will collect and affix to the surface of filter media. In addition, this static dissipation contributes to a lower pressure drop over the life cycle of the bag house filtration system thus lessening the energy requirements for users and installers of bag house filters into bag house filtration systems.

Thus, according to one aspect of the invention, a static dissipative textile filter media or substrate has been developed by providing a unique conductive composition on the filamentary glass yarn filter material or substrate which prevents excessive build up of particles on the filter media surface to enhance cleaning and control the effects of filter cake buildup. The conductive composition is sealed onto the yarns of the filter material by a second polymeric composition. The textile is formed primarily from glass filament yarns and can be a woven or knitted textile. Alternatively, there are some high performance polymeric yarns that will satisfactorily operate in the lower ranges of high temperatures that would need to have the static dissipative features.

The first or conductive composition is a bath containing conductive carbon black, a fluoropolymer (serving in part as a binder) and a lubricant (in the case of glass yarn). Conductive carbon black dissipates static electricity while the lubricant provides adequate flexural properties to the glass yarn textile allowing the textile to withstand the rigors of a bag house filtration system. The first composition is dried. A second composition, a bath containing primarily water and a fluoropolymer, is applied to both the textile and the first composition, the second composition serving to seal the first composition onto the yarns of the textile so that carbon black does not flake off during use.

Further, while the woven glass or other high temperature yarn fabric is sometimes itself the filter media, in other installations, it is a substrate to which a porous polymeric membrane (the actual filter) is attached. In such cases, it has been discovered that the second composition promotes adherence or bonding of the polymeric film or membrane to the substrate. Even in this case, the textile substrate is capable of dissipating static electricity, preventing excessive build-up of contaminants or contaminating particles on the surface of the filter membrane, and enhancing cleaning of the bag filter for use in a bag house filtration system.

BRIEF DESCRIPTION OF DRAWINGS

FIG. 4A is a sectional view of the bag of FIG. 3 taken substantially along lines 4A-4A in FIG. 3 and illustrating the situation in which the glass textile fabric serves as a filter; and FIG. 4B is a sectional view of the bag of FIG. 3 taken substantially along lines 4B-4B of FIG. 3 and illustrating the situation in which the glass textile fabric serves as a substrate for a filter membrane.

DESCRIPTION OF PREFERRED EMBODIMENTS

Certain exemplary embodiments of the present invention are described below and illustrated in the accompanying Figures. The embodiments described are only for purposes of illustrating embodiments of the present invention and should not be interpreted as limiting the scope of the invention. Other embodiments of the invention, and certain modifications and improvements of the described embodiments, will occur to those of skill in the art, and all such alternate embodiments, modifications and improvements are within the scope of the present invention.

Figure 1:
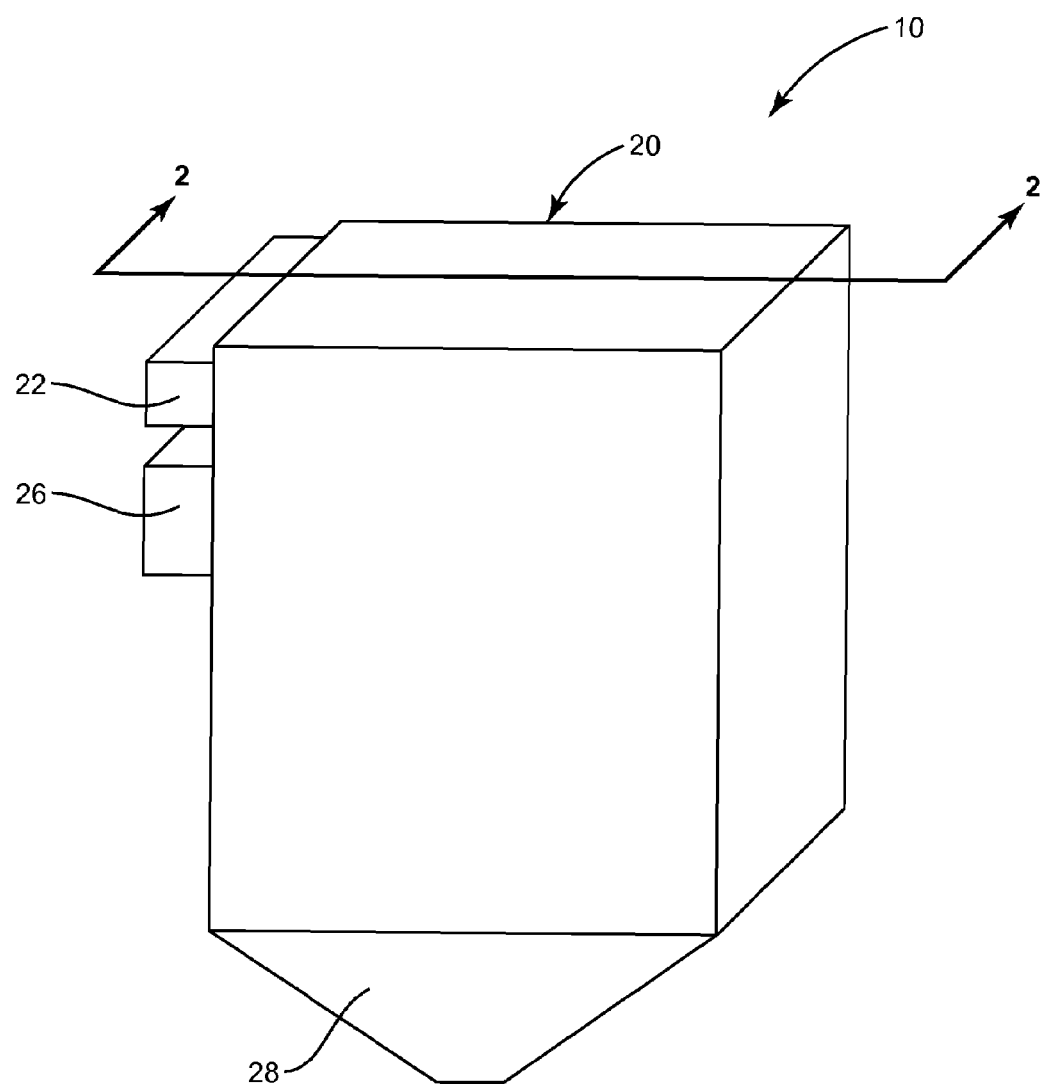
FIG. 1 is a perspective view illustrating a typical bag house used in a bag house filtration system.
Figure 2:
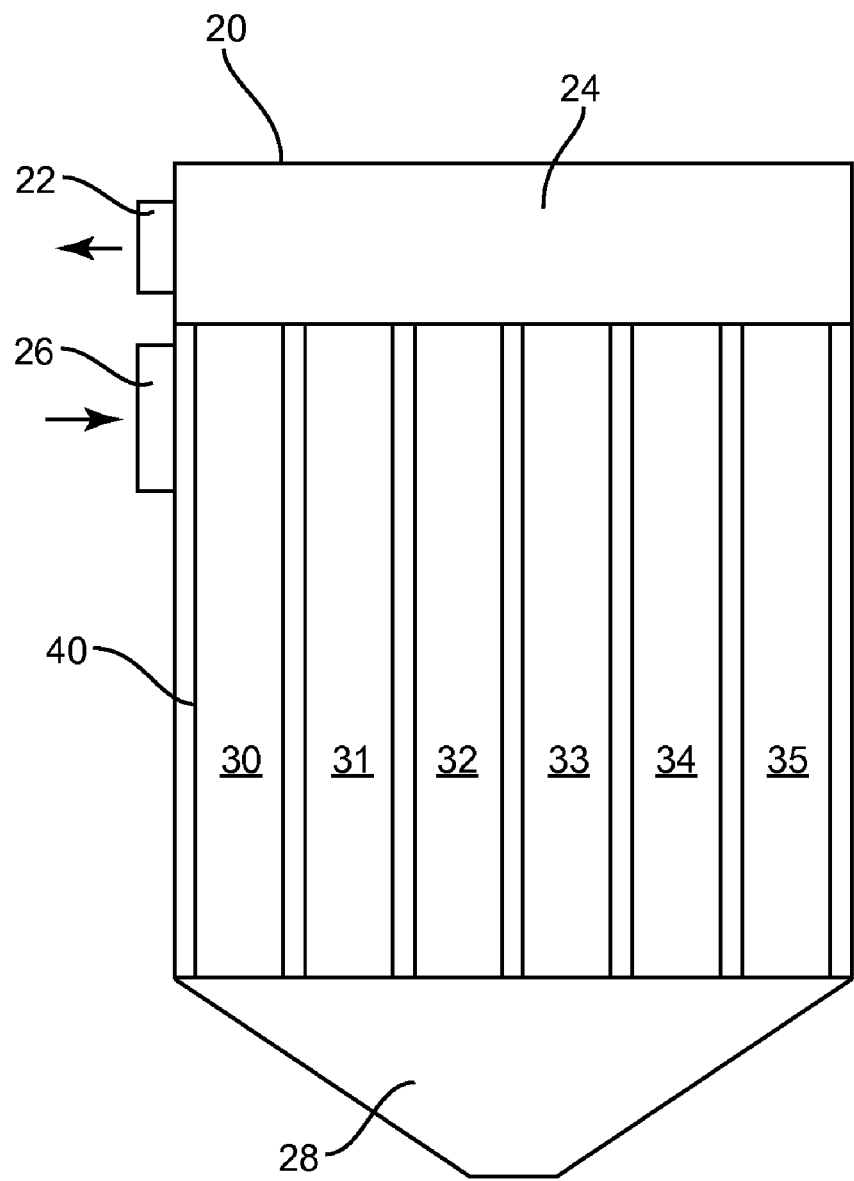
FIG. 2 is a schematic sectional view of the bag house of FIG. 1 taken substantially along lines 2-2 in FIG. 1.

Referring to FIGS. 1 and 2 a typical bag house filtration system 10 is shown. The inventors contemplate that the bag house filtration system 10, as described herein, can be used as either a pollution control system or a particle collection system, or both as discussed above. Typical bag house systems 10 comprise a bag house 20, input 26, output 22 and collection portion 28. The bag house 20 has a plurality of bags 30 through 35 shown in FIG. 2 aligned generally parallel to each other and oriented vertically within bag house 20. The embodiment shown in FIG. 2 uses six bags in a row and one or more rows, however, more bags or fewer bags can be used as the need may arise.

Particle filled air is introduced into the bag house 20 through the input 26. Air is forced through bags 30 and exits through the top into a clean air chamber 24 (shown above the top of bags 31 through 35 in FIG. 2) and exiting the bag house through output 22. As shown, the bag(s) 30 serve as a barrier to the particles captured in the air stream that is introduced to the bag house 20. Some particles strike the surface of bag 30 and fall towards the particle collection portion 28, while some particles can collect on the bag 30 forming a filter cake.

Figure 3:
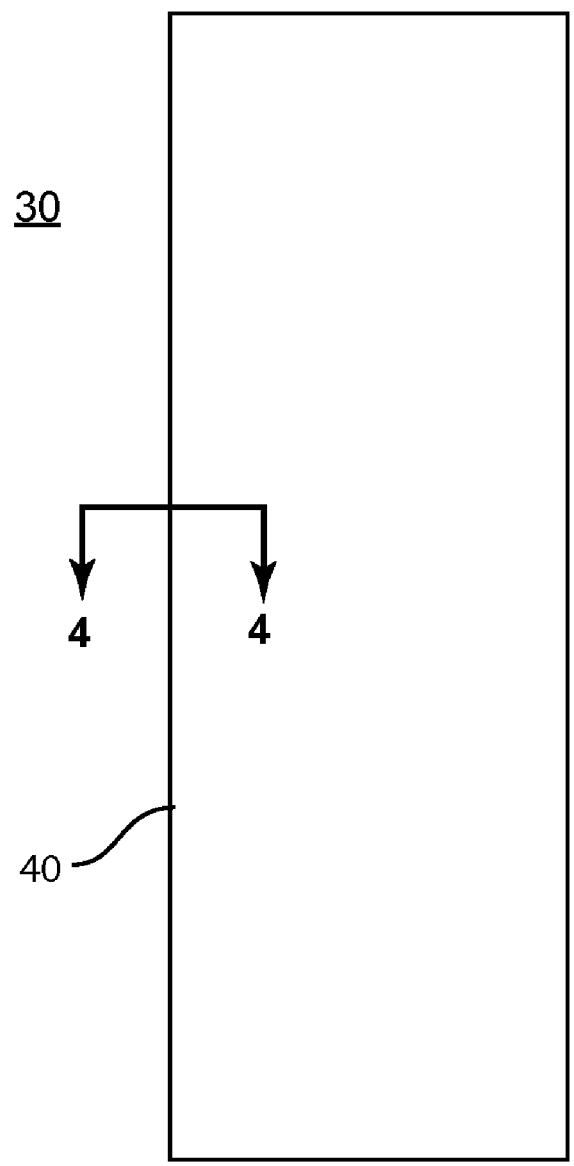
FIG. 3 is a side schematic representative of a single bag.

FIGS. 3, 4A, and 4B show a bag and two embodiments of the present invention designed to minimize filter cake buildup as described above. The bag 30 is preferably formed from a filter media 40. One type of filter media 40 is a woven textile 60 formed primarily from glass yarns (FIG. 4A). Another type of filter media 40 is laminate of a woven textile 60' and a porous polymeric membrane 50 (as shown in FIG. 4B).

Referring now to FIG. 4A, filter media 40 comprises a textile 60 having a first topcoat 62 formed by a first composition or bath and a second topcoat 64 formed by a second composition or bath as shown. The textile 60 can be any material formed primarily from glass or other high temperature yarns such as a woven or a knit. Woven fabrics are preferred because of their ability to withstand the rigors of bag house filtration systems. Woven structures such as a plain weaves, basket weaves, twills, satins, and sateens as they are known in the art are suitable structures for use in filter media 40. Additionally, as the need may arise, the inventors contemplate even more complex woven structures or even knit structures to form the textile. The fabric is formed with a construction that provides any pore size required by a customer. The first and second topcoats when dried do not clog the pores formed by the interstices in the woven fabric.

As referred to above, the woven textile is formed primarily from glass yarns. Glass is a preferred yarn and fiber type. Some bag house filtration systems operate with the air system passing through at high temperature environments, i.e. over about 300° F. In such high temperature (>300° F.) environments glass fibers are preferred. The present invention, however, has application in environments in which the air stream is elevated, but at the lower end of the high temperature environment. Thus, though less preferred, fabrics formed of other synthetic yarns such as aramids, para-aramids, polyphenylene sulphide (PPS), polytetrafluoroethylene (PTFE), polyimide (P84) and blends thereof (hereinafter referred to along with glass as "high temperature yarns") are used as the need may arise. All of these fabrics, however, are known to generate a static charge in the presence of moving air. Known yarn formation systems are used to form the yarns, though continuous filaments yarns are preferred over yarns formed from staple fibers. In addition, core-spun, or other composite yarns structures are also contemplated by the inventors for use in certain textile filter media.

Upon formation of woven textile 60, a first bath or composition is applied to the textile. The inventors contemplate the use of known methods for applying compositions to woven, knit, and non-woven materials. These include, but are not limited to, saturation, padding, submersion, coating, spray and exhaustion methods. In one embodiment, a saturation process is used. Here, the woven textile 60 is submerged in the bath comprising the first composition. The woven textile retains first compositions at level between about between about 15% to about 200% based on weight of the fabric (i.e. wet pick up as is known in the art). A subsequent padding step removes excess composition while leaving a portion called a first topcoat 62 which is fixed to the yarns of the woven textile 60 through a later drying step. Although a drying step is preferred at this point, the woven textile with the first topcoat 62 can be immediately processed further as described below. It is important to note that, while the first composition saturates and/or coats the yarns of the woven textile 60, the first composition is not a continuous film-forming composition and thus the pores of the woven textile 60 remain largely unobstructed.

The first bath or composition as incorporated onto the yarns of the woven textile 60 form a conductive and static dissipative textile as will be described below. The static dissipative textile used in a bag house filtration system 10 dissipates static build up and enhances the cleaning efficiency of the bag 30 by minimizing filter cake formation and its retention on the bag surface.

The first bath or composition contains a conductive component, a fluoropolymer and, in the case of fabrics formed from glass yarns, a lubricant, with the balance of the composition primarily water. In a preferred embodiment, the conductive component is a conductive carbon black dispersion. Carbon black dispersion comprises at least about 5% by weight of the first composition, preferably at least about 9% by weight of the first composition, but most preferably carbon black dispersion comprises at least about 13% by weight of the first composition. Less preferred but still effective conductive components include similar percentages of conductive polymers, such as polypyrole, dispersions of finely divided metallic powders, carbon namotubes, carbon particulates, and surfactant/amphoteric materials such as glycerol monostearate, quaternary ammonium compounds and the like.

The fluoropolymer dispersion in the first composition is preferably polytetrafluoroethylene, which has several functions in the present invention. The fluoropolymer dispersion also acts as an additional lubricant, a binder and a barrier. The first bath or composition generally serves to adhere or secure the conductive component to the yarns, or to a portion of the yarns, of the woven textile 60. The fluoropolymer dispersion used in the first composition is also referred to as the first fluoropolymer. This adherence is achieved in part, by use of the first fluoropolymer as a binder to seal the conductive component, i.e. carbon black in particular, to the yarns. While polytetrafluoroethylene is preferred, other engineering polymers might possibly work. For example, polyamide imide is one. No matter the intended use of the filter media 40, i.e. as a woven textile filter media 40 itself or a laminate filter media 40' with membrane 50, the fluoropolymer dispersion comprises at least about 5% by weight of the first composition, preferably at least about 7% by weight of the first composition, and most preferably at least about 9% by weight of the first composition.

In the case of glass yarns, lubrication is required. In such a case, the lubricants in the first composition contain silicone and graphite dispersions which together make up at least one percent (1%) by weight of the first composition. As used herein "dispersions" refer to a suspensions of agents in a liquid phase. The silicone and graphite dispersions cooperate to lubricate the glass yarns in woven textile 60 to improve the flexural behavior of the bag 30 when used in the bag house filtration system 10. The silicone dispersion comprises at least 0.5% by weight and less than about 10% by weight of the first bath, preferably less than about 5% by weight of the first bath, and most preferably less than about 3% by weight of the first bath. The graphite dispersion comprises at least 0.5% by weight and less than about 10% by weight of the first bath, preferably less than about 5% by weight of the first bath, and most preferably less than about 3% by weight of the first bath.

After the first bath is applied to the woven textile 60 and dried to form first topcoat 62, a second bath is applied over the topcoat and the woven textile 60 to form a second topcoat 64. The second bath is also applied using known methods for applying compositions to woven, knit, and non-woven materials. These include, but are not limited to saturation, padding, submersion, coating, spray and exhaustion methods. The second composition is applied so as to encase and seal the first composition onto the yarns of the textile but leaving the pores of the woven textile 60 unobstructed to a degree.

The second bath or composition contains primarily a fluoropolymer dispersion and water. The fluoropolymer dispersion as used in the second compositions is also referred to as the second fluoropolymer. The fluoropolymer dispersion comprises at least about 5% by weight of the second composition, preferably at least about 10% by weight of the second composition, and most preferably at least about 20% weight of the second composition. The preferred fluoropolymer again is polytetrafluoroethylene. The second composition is preferable, however is not critical to the invention unless the porous membrane 50 is attached thereto as described below. In such a case the second fluoropolymer also becomes the glue for the membrane.

FIG. 4B shows another embodiment of a filter media 40' used in the present invention. As shown, the filter media 40' is lamina of a porous membrane 50, first and second topcoats 62', 64' and woven textile 60'. The porous membrane 50 is laminated to the woven textile 60 by methods known to those skilled in art. Preferably the porous membrane 50 is a porous polymer membrane or film such as poly-tetrafluoroethylene (PTFE) or expanded polytetrafluoroethylene (ePTFE). The filtration efficiency is known to improve when ePTFE is used as a membrane 50 on the substrate 40' and is thus a preferred porous membrane. In addition to sealing the carbon black ink to the yarns of the substrate 60', the second topcoat 64' serves to improve adhesion between and ePTFE membrane and the woven textile 60' and first topcoat 62'.

Filter media 40' is used in bags where porous membrane 50 is desired. As used in this embodiment, the second topcoat 64' encases and seals the conductive components of the first topcoat 62' to the woven textile 60'. Thus the pores of porous membrane 50' remain unobstructed in the event the conductive components detach from the woven textile 60' in use and in particular during the flexing cycle used to remove the filter cake.

In addition, when the circumstances dictate that a fluoropolymer based porous membrane 50 is desired, such as expanded polytetrafluoroethylene (ePTFE) or polytetrafluoroethylene (PTFE), the second fluoropolymer acts as a barrier to the conductive components, and carbon black in particular, which might otherwise become detached during the flexing cycles of the bag 30 and possibly clog the pores of the woven textile 60 and/or the membrane 50. Thus, the second fluoropolymer minimizes unintended clogging of the porous membrane 50.

Thus a bag 30 formed from a filter media 40 (or 40') has been described. The conductive composition on the textile 60 (or 60') dissipates static charge that builds up in bag 30, as well as static that builds up in the dust cake. Because the static charge is dissipated, the formation of filter cake buildup is minimized; cleaning and particle collection is improved. In addition, the pressure drop is maintained at lower levels over an extended period of time thus decreasing energy requirements. Thus the inventors have used the filter media 40 to decrease the overall energy input and improve the cleaning efficiency. The following is an example of one embodiment of the invention.

EXAMPLE 1

By way of example, glass continuous filament glass yarns are woven into a fabric with a weight of $9.35\,oz^2/yd^2$. The fabric is known as BGF Style No. 427. The weave pattern is a 1×3 right hand twill. The warp yarns are ECDE 75 (7500 yds/#). The fill yarns are plied yarns formed of ECDE 150 filamentary and ECDE 50 textured. There are 54 ends/inch in the warp and 30 ends/inch in the fill. A first bath, as shown below, was applied to the woven fabric using a saturation process known in the art. After drying, a second composition was applied following application of the first composition. Resistance of this filter media, a measure of conductivity, was recorded at $3.5\times10^6$ ohms, measured in accordance with BGF Lab Procedure No. QCMANF43.

|  | 1st Composition | 2nd Composition |
| --- | --- | --- |
| Fluoropolymer | 9% | 20-% |
| Lubricant | 1.8% | N/A |

-continued

|  | 1st Composition | 2nd Composition |
| --- | --- | --- |
| Carbon Black Pigment | 13% | N/A |
| Water | 76.2% | 80-% |

The textile filter media was then laminated to membrane of expanded polytetrafluoroethylene and formed into a bag for use in the bag house filtration system.

The above descriptions of various embodiments of the invention are intended to describe and illustrate various elements and aspects of the invention. Persons of ordinary skill in the art will recognize that certain changes and modifications can be made to the described embodiments without departing from the scope of the invention. All such changes and modifications are intended to be within the scope of the appended claims.

I claim:

1. A static electricity dissipative filter media for a bag house filtration system operated at high temperatures in which the air stream passing through the bag house exceeds 300° F., the filter media comprising:
    a. a woven textile formed primarily from high temperature yarns selected from the group consisting of glass yarns, and yarns formed of PPS, aramid, P84, PTFE, and blends thereof capable of withstanding the high temperatures, but which generates static electricity in the presence of moving air;
    b. the yarns of the woven textile, coated with a first composition comprising a conductive component and a fluoropolymer;
    c. the yarns of woven textile also coated with a second composition on top of the first composition and also containing a fluoropolymer, the second composition serving to seal the first composition onto the yarns of the woven textile and to prevent clogging of the pores of the woven textile;
    d. whereby static electricity in the filter media is dissipated by the conductive component thus reducing excessive buildup of contaminating particles and enhancing cleaning.

2. The filter media according to claim 1 wherein the high temperature yarn is formed of glass filaments and the first composition includes a lubricant.

3. The filter media of claim 2, wherein the conductive component is selected from the group consisting of carbon black, polypyrole, metallic powders, carbon nanotubes, carbon particulates, and surfactant/amphoteric materials.

4. The filter media of claim 3, wherein the conductive component is present in the first composition in an amount effective to dissipate static electricity in the filter media.

5. The filter media of claim 3, wherein the conductive component is carbon black and makes up at least 5% of the first composition by weight.

6. The filter media of claim 1, wherein the fluoropolymer in the first composition is polytetrafluoroethylene.

7. The filter media of claim 1, wherein the fluoropolymer in the first composition acts as a binder securing the conductive component to at least a portion of the glass yarns.

8. The filter media of claim 1, wherein the fluoropolymer in the first composition makes up at least 5% of the first composition by weight.

9. The filter media of claim 2, wherein the lubricant further comprises a silicone dispersion and a graphite dispersion.

10. The filter media of claim 2, wherein the lubricant makes up at least 1% of the first composition by weight.

11. The filter media of claim 1, wherein the fluoropolymer in the second composition makes up at least about 5% by weight of the second composition.

12. A static electricity dissipative filter media for a bag house filtration system operated at high temperatures in which the air stream passing through the bag house exceeds 300° F., the filter media comprising:
    a. a woven textile formed primarily from high temperature yarns selected from the group of glass yarns, and yarns formed of PPS, aramid, P84, PTFE, and blends thereof capable of withstanding the high temperatures, but which generates static electricity in the presence of moving air;
    b. the yarns of the woven textile coated with a, the first composition comprising a conductive component and a fluoropolymer;
    c. the yarns of the woven textile also coated with a second composition on top of the first composition and also containing a fluoropolymer composition serving seal the first composition onto the yarns of the woven textile and to prevent clogging of the pores of the woven textile;
    d. a fluoropolymer porous membrane laminated to at least one side of the woven textile; and
    e. whereby static electricity in the filter media is dissipated by the conductive component thus reducing excessive buildup of contaminating particles and enhancing cleaning.

13. The filter media according to claim 12, wherein the high temperature yarn is formed of glass filaments and the first composition includes a lubricant.

14. The filter media of claim 13, wherein the conductive component is selected from the group consisting of carbon black, polypyrole, metallic powders, carbon nanotubes, carbon particulates, and surfactant/amphoteric materials.

15. The filter media of claim 13, wherein the conductive component is present in the first composition in an amount effective to dissipate static electricity in the textile filter media.

16. The filter media of claim 13, wherein the conductive component is carbon black and makes up at least 5% of the first composition by weight.

17. The filter media of claim 12, wherein the fluoropolymer in the first composition is polytetrafluoroethylene.

18. The filter media of claim 12, wherein the fluoropolymer in the first composition is a binder securing the conductive component to at least a portion of the glass yarns.

19. The filter media of claim 12, wherein the fluoropolymer in the first composition makes up at least 5% of the first composition by weight.

20. The filter media of claim 13, wherein the lubricant further comprises a silicone dispersion and a graphite dispersion.

21. The filter media of claim 13, wherein the lubricant makes up at least 1% of the first composition by weight.

22. The filter media of claim 12, wherein the fluoropolymer in the second composition makes up at least about 5% by weight of the first composition.

23. The filter media of claim 12, wherein the fluoropolymer based porous membrane is selected from the group consisting of polytetrafluoroethylene and expanded polytetrafluoroethylene.

24. A bag house filtration system operated at high temperatures in which the air stream passing through the bag house exceeds 300° F., comprising:

a. at least one bag formed from a static electricity dissipative textile filter media;
b. the filter media including a woven textile formed primarily from high temperature yarns selected from the group consisting of glass yarns, and yarns formed of PPS, aramid, P84, PTFE, and blends thereof capable of withstanding the high temperatures, but which generate static electricity in the presence of moving air;
c. the yarns of the woven textile, coated with a first composition comprising a conductive component and a fluoropolymer;
d. the yarns of the woven textile also coated with a second composition on top of the first composition and also containing a fluoropolymer composition serving to seal the first composition onto the yarns of the first composition on the woven textile and to prevent clogging of the pores of the woven textile;
e. whereby static electricity in the filter media is dissipated by the conductive component thus reducing excessive buildup of contaminating particles and enhancing cleaning.

25. The bag house filtration system according to claim 24 wherein the high temperature yarn is formed of glass filaments and the first composition includes a lubricant.

26. The bag house filtration system of claim 25, wherein the conductive component is selected from the group consisting of carbon black, polypyrole, metallic powders, carbon nanotubes, carbon particulates, and surfactant/amphoteric materials.

27. The bag house filtration system of claim 25, wherein the conductive component is present in the first composition in an amount effective to dissipate static electricity in the textile filter media.

28. The bag house filtration system of claim 25, wherein the conductive component is carbon black and makes up at least 5% of the first composition by weight.

29. The bag house filtration system of claim 24, wherein the fluoropolymer in the first composition is polytetrafluoroethylene.

30. The bag house filtration system of claim 24, wherein the fluoropolymer in the first composition is a binder securing the conductive component to at least a portion of the glass yarns.

31. The bag house filtration system of claim 24, wherein the fluoropolymer in the first composition makes up at least 5% of the first composition by weight.

32. The bag house filtration system of claim 25, wherein the lubricant further comprises a silicone dispersion and a graphite dispersion.

33. The bag house filtration system of claim 25, wherein the lubricant makes up at least 1% of the first composition by weight.

34. The bag house filtration system of claim 25, wherein the fluoropolymer in the second composition makes up at least about 5% by weight of the second composition.

35. The bag house filtration system of claim 25, wherein a fluoropolymer based porous membrane is laminated to at least one side of the woven textile.

36. The bag house filtration system of claim 35, wherein the fluoropolymer based porous membrane is selected from the group consisting of polytetrafluoroethylene and expanded polytetrafluoroethylene.

* * * * *